(12) United States Patent
Michel

(10) Patent No.: US 7,780,177 B2
(45) Date of Patent: Aug. 24, 2010

(54) WHEEL SUSPENSION FOR STEERED WHEELS OF MOTOR VEHICLES

(75) Inventor: Wifried Michel, Riedenburg (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 12/401,971

(22) Filed: Mar. 11, 2009

(65) Prior Publication Data

US 2009/0230640 A1    Sep. 17, 2009

(30) Foreign Application Priority Data

Mar. 12, 2008    (DE) .................. 10 2008 013 913

(51) Int. Cl.
  *B60G 3/26*    (2006.01)
(52) U.S. Cl. ............................. 280/124.146
(58) Field of Classification Search .......... 280/124.146, 280/124.147, 124.151, 124.154, 6.157, 6.159
  See application file for complete search history.

(56) References Cited

U.S. PATENT DOCUMENTS 4,042,259 A * 8/1977 Fiedler et al. ......... 280/124.155
5,242,190 A * 9/1993 Morris ..................... 280/5.503
2007/0170684 A1* 7/2007 Ohkita et al. ......... 280/124.147
2007/0210539 A1* 9/2007 Hakui et al. ............. 280/5.514

FOREIGN PATENT DOCUMENTS

DE       10219815 A1    11/2003
DE    102007011615 A1     9/2007

* cited by examiner

*Primary Examiner*—Faye M. Fleming
(74) *Attorney, Agent, or Firm*—Novak Druce + Quigg LLP

(57) ABSTRACT

The invention relates to a wheel suspension for steered wheels of motor vehicles having a telescoping shock absorber which is preferably permanently connected to the wheel carrier and a helical compression spring which surrounds it and which is clamped between a lower spring plate which is preferably permanently connected to the shock absorber tube and an upper, body-side spring plate. According to the invention for vertical adjustment of the body around the shock absorber there is an actuator, and the actuator acts by way of an actuating pinion with the interposition of an axial anti-friction bearing on the upper spring plate.

14 Claims, 2 Drawing Sheets

(State of the Art)

WHEEL SUSPENSION FOR STEERED WHEELS OF MOTOR VEHICLES

BACKGROUND OF THE INVENTION

The invention relates to a wheel suspension for steered wheels of motor vehicles.

Such wheel suspensions for steered wheels of motor vehicles are often known as McPherson front axles, with the property of a wheel-guiding telescoping shock absorber whose shock absorber tube is permanently connected to the wheel carrier and whose piston rod is coupled on the body side. The steering axle of the wheel suspension is defined here by the upper coupling point of the piston rod and the lower coupling point of the wheel carrier on a suspension arm.

The shock absorber in a McPherson front axle is wheel-guiding, i.e., the wheel contact force applies a moment to the piston rod and thus to the entire shock absorber system. The transverse forces resulting from the wheel contact forces on the shock absorber guides are equalized by the axial offset of the spring axis and shock absorber axis, i.e., an asymmetrical incline of the helical compression spring to the center axis of the shock absorber. The helical compression spring on its upper, body-side spring plate is supported by way of an axial anti-friction bearing and thus turns concomitantly in the steering motions of the wheels with the wheel carrier and the shock absorber tube.

Furthermore, DE 10 2005 001 742 A1, for example, discloses a wheel suspension with a vertical adjustment device in which around the piston rod of the shock absorber there is an electromotive actuator with an inertia drive or ball screw mechanism and a ring-shaped electric motor. The adjusting nut of the inertia drive acts directly on the upper spring plate of the centrally arranged helical compression spring.

The problem is when, as in the aforementioned McPherson front axle, the shock absorber and the helical compression spring turn at the same time in a wheel deflection. This results in that for the steering motion of the wheels the adjusting nuts would turn relative to the remaining actuator and would unintentionally cause vertical adjustment.

The object of the invention is to propose a wheel suspension for steered wheels of motor vehicles according to the generic concept which with integration of a vertical adjustment device in a manner free of transverse forces works with precision vertical adjustment when force is delivered into the body in a manner favorable to vibration engineering.

SUMMARY OF THE INVENTION

According to the invention, it is proposed that for vertical adjustment of the body around the shock absorber, there is a preferably electromotive actuator which acts via an actuating pinion, such as an inertia drive, with a spindle which is driven by way of an electric motor, for example, and an adjusting nut with the interposition of an axial anti-friction bearing on the upper spring plate. The spindle is pivoted and the electric motor is held by way of a base part to which the piston rod is attached, the base part being supported on the body by way of a rubber-elastic shock absorber bearing. These features result in that for steering motions the concomitantly turning helical compression spring is decoupled from the adjusting nut, that is, no unintentional vertical adjustments occur. On the other hand, the entire actuator including the electric motor for the kinematically dictated pivoting motions of the entire McPherson strut unit which are superimposed on the steering motions can pivot at the same time and thus is not subject to any deformation.

In an especially advantageous development of the invention, the axis of rotation of the rotationally symmetrical spindle of the actuator and the center axis of the adjusting nut deviate from the center axis of the helical compression spring. This effectively eliminates the transverse forces and deformations of the bearings which occur due to the axial offsetting of the helical compression spring.

Furthermore, the electric motor of the actuator can be located outside of the helical compression spring and coaxial to it and can drive the spindle by way of a pinion or by an intermediate gear. Thus, a structurally simple, economical electric motor can be used which, moreover, can be matched to the existing installation space with consideration of the pivoting motions which occur.

The electric motor can preferably act on the external toothing on the spindle by way of a pinion and an intermediate gear. But a toothed belt could also be used instead of an intermediate gear.

Furthermore, the base part can have a bearing plate which carries the electric motor and on which the intermediate gear is also pivoted, in a manner which is favorable to construction and production engineering.

The base part can be provided in a structurally compact design with a rotationally symmetrical guide sleeve which projects down, on which the spindle is pivoted to be axially immovable and which has an intermediate bottom to which the piston rod of the shock absorber is attached.

To achieve effective vibration damping, the adjusting nut with the spring plate molded on can furthermore act on the helical compression spring by way of the rubber-elastic damping ring and the axial anti-friction bearing.

If the shock absorber bearing is located between the bearing plate and the base plate of the base part which can be joined to the body, the entire McPherson strut unit with the attached actuator can be produced as a preassembly unit and can be easily installed in the motor vehicle in a manner favorable to installation.

Conventionally, the inertia drive can be a ball screw mechanism with balls guided between the spindle and the adjusting nut in ball races, which is characterized by especially easy actuation and low-wear, durable accommodation of actuating forces.

Finally, the adjusting nut can be advantageously movably guided positively on a section of the guide sleeve which projects down in the peripheral direction by way of a guide ring which projects radially to the inside so that the adjusting nut is guided to be axially movable, but non-rotatable in a manner which is simple in terms of production engineering.

DETAILED DESCRIPTION OF THE PREFERRED EMBODIMENT OF THE INVENTION

Figure 1:
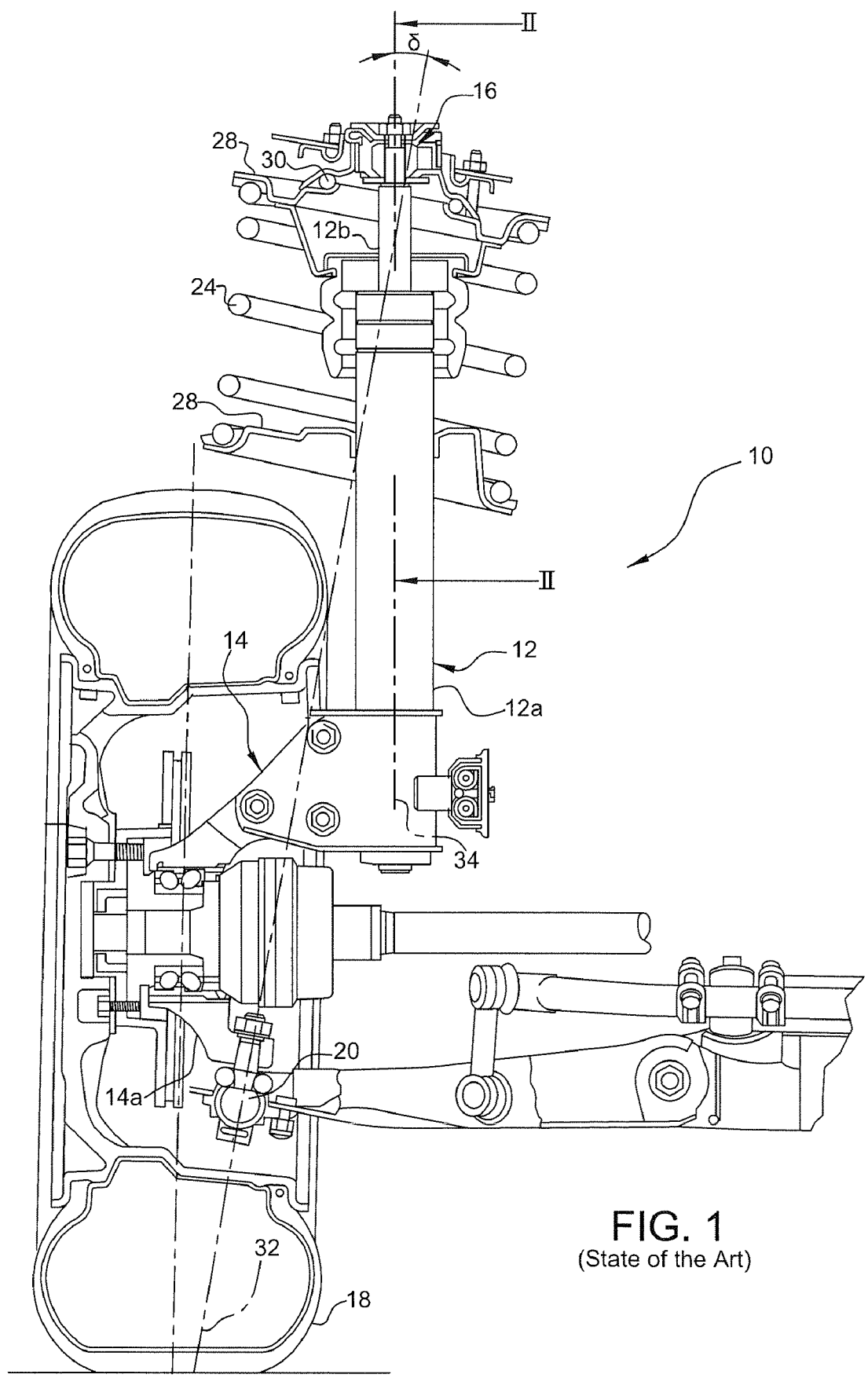
FIG. 1 shows a McPherson wheel suspension which corresponds to the prior art for steered wheels of motor vehicles, in a view opposite the direction of travel.

The McPherson wheel suspension 10 which is shown in FIG. 1 and which corresponds to the prior art is only described to the extent necessary for understanding of this invention.

The wheel suspension 10 has a telescoping shock absorber 12 whose shock absorber tube 12a is permanently connected to the wheel carrier 14. The fixed connection of the telescoping shock absorber 12 to the wheel carrier 14 should be understood as a rigid connection between the two components without bearings. The piston rod 12b of the shock absorber 12 which projects up is coupled to the body (not shown) of the motor vehicle by way of a rubber-elastic shock absorber bearing 16.

The wheel 18 of the motor vehicle is pivoted on the wheel carrier 14. Furthermore, the wheel carrier 14 with a lower arm 14a is joined by way of a ball-and-socket joint 20 to the lower suspension arm 22 of the wheel suspension 10. The steering means of the motor vehicle (e.g., rack and pinion steering) coupled to the steering arm (not shown) of the wheel carrier 14 is not shown.

Around the shock absorber 12 as the support spring there is a helical compression spring 24 which on the one hand is supported by way of a lower spring plate 26 and on the other hand on the upper spring plate 28. The spring plate 26 is attached to the shock absorber tube 12a, while the upper spring plate 28 is connected likewise to the shock absorber bearing 16 by way of an axial anti-friction bearing 30.

The steering axis 32 of the wheel suspension 10 is defined, as is apparent, by the center points of the ball-and-socket joint 20 on the wheel carrier 14 and the upper coupling point to the shock absorber bearing 16 via which the wheel 18 is pivoted in steering motions.

The center axis 34 of the shock absorber conversely lies clearly within the steering axle 32 in order to ensure the necessary freedom of motion of the wheel 18.

This results in that, based on the static and dynamic wheel loads on the shock absorber guides (guides of the piston rod 12b in the shock absorber tube 12a—not visible), transverse forces and bending moments would occur which, however, are compensated by the inclination and/or axial offset of the helical compression spring 24. The center axis of the helical compression spring 24 essentially coincides with the steering axis 34. This is achieved, as is apparent, by the asymmetrical configuration and coupling of the spring plates 26, 28 on the shock absorber tube 12a or on the shock absorber bearing 16.

In general, adopting the vertical adjustment device known in the prior art into the McPherson wheel suspension 10 is a problem due to the axial offset, i.e., the differently aligned shock absorber axes and spring axes. The stroke path in this case would change along the center axis 34 of the shock absorber which, however, is not identical to the spring axis. As a result of geometrical circumstances, in this type of adjustment the axial offsetting would changed dramatically, i.e., the angle between the spring axis and shock absorber axis would change unduly, as a result of which equalization of transverse forces would be neutralized. Moreover, very high transverse forces would act on the actuator due to the extremely oblique spring axis.

Purely theoretically it would be possible to incline the actuator axis relative to the center axis 34 of the shock absorber so that the actuator axis would coincide with the spring axis. But the actuator accordingly would have to be correspondingly widened in diameter. The actuator would, moreover, extend down, that is, in the region underneath the lower spring plate 26. But this does not allow free motion of the tires.

Alternatively, the vertical adjustment actuator would necessarily have to be housed in the body dome and, moreover, take part in the pivoting motion of the McPherson strut unit. If, for example, the vertical adjuster located in the dome of the McPherson strut unit were made without an axial bearing, one part would be stationary, the other, however, would pivot at the same time. The result would be vertical drifting of the body of the vehicle, caused by the rise of the ball screw mechanism by way of wheel deflection, and, moreover, increased wear on the ball screw mechanism.

In contrast to the aforementioned proposed solutions for adopting vertical adjustment in the McPherson front axle, the vertical adjustment according to the invention on the McPherson strut unit is based on the fact of combining the actuator with the axial antifriction bearing 30 and allowing it to pivot concomitantly by way of a molded-on rubber-metal bearing 72, not only radially, but also cardanically with the entire McPherson strut unit, as described below.

Figure 2:
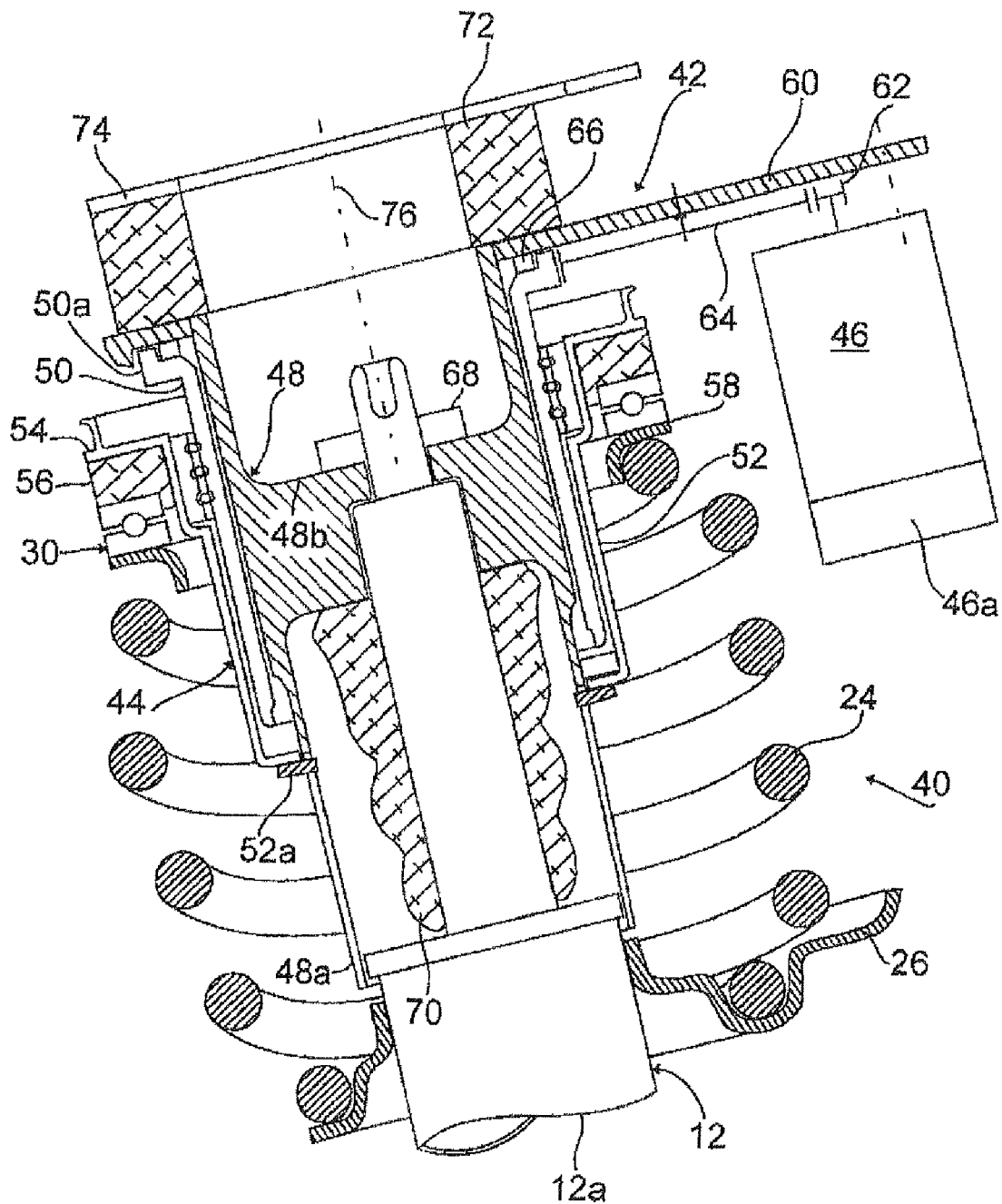
FIG. 2 shows a section along line II-II of FIG. 1 through a modified McPherson wheel suspension which is provided with a vertical adjustment device with an electromotive actuator.

FIG. 2 shows in a section shown in FIG. 1 a modified McPherson wheel suspension 40 with an electromotive actuator 42 for vertical adjustment of the body of the motor vehicle, for example, into the normal position, a lower sports position, and a higher all-terrain position. If not shown, the wheel suspension 40 is conformal to the wheel suspension 10 as shown in FIG. 1. Essentially identical parts are provided with the same reference numbers.

The electromotive actuator 42 is composed essentially of an inertia drive or a ball screw mechanism 44 and a drive electric motor 46.

The ball screw mechanism 44 is located around the piston rod 12b and the shock absorber tube 12a of the shock absorber 12 and has a tubular spindle 50 which is pivotally guided on a guide sleeve 48 and a likewise tubular, rotationally-symmetrical adjusting nut 52, which are propulsively connected to one another by way of thread-like ball races and balls (only suggested) located in between. When the spindle 50 turns, the adjusting nut 52 is axially moved in the corresponding manner, the adjusting nut 52 being guided non-rotationally by way of guide elements 52a which project radially to the inside in the axial grooves of a downwardly projecting section 48a of the guide sleeve 48.

The upper spring plate 54 is molded onto the adjusting nut 52; the helical compression spring 24 is supported on the plate with the interposition of a rubber-elastic damping ring 56 and of the axial antifriction bearing 30 and an intermediate ring 58.

The guide sleeve 48 is securely joined to the bearing plate 60 to which the electric motor 46 is attached which is located laterally next to the helical compression spring 24. The electric motor 46, by way of a pinion 62 and an intermediate gear 64 which is pivoted likewise on the bearing plate 60, drives the spindle 50 which for this purpose is provided with external toothing 50a. Furthermore, between the spindle 50 and the bearing plate 60 an axial antifriction bearing 66 is inserted for supporting the axially acting forces of the helical compression spring 24.

The piston rod 12b of the shock absorber 12 is attached to the intermediate bottom 48b of the guide sleeve 48 by means of a threaded connection 68. On the intermediate bottom 48b there is also an additional rubber-elastic spring 70, as is apparent.

A damping bearing 72 with a base plate 74 is attached to the bearing plate 60 and the entire wheel suspension 40 can be connected to the body of the motor vehicle by way of the bearing.

The ball thread screw mechanism 44 is aligned around the shock absorber 12 such that its axis of rotation 76 essentially coincides with the steering axis 32 or the corresponding center axis of the spring. This offset for equalizing the transverse forces and bending moments is not shown in the section of FIG. 2 which is offset by 90 degrees to FIG. 1.

To vertically move the body of the motor vehicle, the electric motor 46 of the actuator 42 is triggered and turns the spindle 50 of the ball thread screw mechanism 44, as a result of which the adjusting nut 52 accordingly is moved axially and the helical compression spring 24 is more or less pretensioned by way of the spring plate 54. The set position is held by a brake 46a which is provided in the electric motor 46.

In a steering motion of the wheel 18 with the corresponding pivoting of the wheel carrier 14 and turning of the shock absorber tube 12a of the shock absorber 12, as a result of the described arrangement the helical compression spring 24 is also turned with the lower spring plate 26 and the upper intermediate ring 58, while the adjusting nut 52 with the spring plate 54 is decoupled by the axial antifriction bearing 30. Steering movements therefore do not cause turning of the adjusting nut 52 of the ball thread screw mechanism 44.

The entire McPherson strut unit shown in FIG. 2 can thus still pivot together with the spring 24 and the intermediate ring 58 by way of the wheel deflection relative to the body and the actuator 42 itself. The axial offsetting of the spring axis and shock absorber axis thus still remains almost unchanged even when the level is adjusted. Thus the equalization of the transverse forces is for the most part preserved and at the same time free movement of the tires is ensured. But particularly with the actuator 42 according to the invention the height of the vehicle body does not change in a wheel deflection since the ball thread screw mechanism 44 does not move as a result of the axial antifriction bearing 30.

The displacements and pivoting movements of the shock absorber 12 and of the helical compression spring 24 around the upper coupling point of the shock absorber bearing 72 which is integrated into the actuator 42, which occur in a steering motion as a result of the kinematic properties of the entire wheel suspension 10 and 40, are equalized by way of the shock absorber bearing 72 which enables universal resilience or drifting of the entire actuator 42. Thus unwanted deformations and bending moments are kept away from the actuator and especially from the ball screw mechanism 44.

The invention claimed is:

1. A wheel suspension for steered wheels of motor vehicles having a telescoping shock absorber which is preferably permanently connected to the wheel carrier and a helical compression spring which surrounds it and which is clamped between a lower spring plate which is preferably permanently connected to the shock absorber tube and an upper, body-side spring plate wherein
　for vertical adjustment of the body around the shock absorber there is an actuator, and
　the actuator acts by way of an actuating pinion with the interposition of an axial anti-friction bearing on the upper spring plate, and
　wherein the spindle is pivoted and the electric motor is held by way of a base part to which the piston rod is attached.

2. The wheel suspension according to claim 1 wherein the base part is supported on the body by way of the rubber-elastic shock absorber bearing.

3. The wheel suspension according to claim 1 wherein the base part has a bearing plate which carries the electric motor and on which the intermediate gear is also pivoted.

4. A shock absorber assembly for a motor vehicle, comprising;
　a base member connectable to a wheel carrier of said vehicle;
　a piston cooperating with said base member;
　a coil spring supported on a lower flange provided on said base member, and provided with an upper, annular flange seated thereon;
　a guide member mounted on said piston, having a radially projecting portion relative to said piston;
　means mounted on said radially projecting portion connectable to a body portion of said vehicle;
　a tubular member disposed coaxially relative to said piston and base member;
　an annular member disposed coaxially relative to said tubular member, supported on said upper, annular flange seated on said coil spring, and having a ball screw connection with said tubular member;
　a motor mounted on said projecting portion of said guide member, and
　means supported on said projecting portion of said guide member for transmitting rotary motion of said motor to said tubular member.

5. An assembly according to claim 4 including cushioning means disposed between said piston and said base member.

6. An assembly according to claim 4 including an annular bearing seated on said upper, annular flange seated on said coil spring, wherein said annular member is supported thereon.

7. An assembly according to claim 6 including cushioning means interposed between a portion of said annular member and said bearing.

8. An assembly according to claim 6 wherein said bearing comprises a roller bearing.

9. A system according to claim 4 including means functionally interacting between said annular member and said base member to permit axial displacement of said annular member and preclude rotational movement thereof relative to the axis of said piston upon rotation of said tubular member.

10. A system according to claim 9 wherein said means mounted on said radially projecting portion of said guide member connectable to a body section of said vehicle, is formed of a cushioning material.

11. A system according to claim 10 wherein said means mounted on said radially projecting portion of said guide member has an annular configuration and is disposed coaxially relative to the axis of said piston.

12. A system according to claim 4 wherein said means for transmitting rotary motion from said motor to said tubular member comprises a gear train.

13. A system according to claim 4 wherein the axes of said piston, said coil spring and a steering axis of said wheel carrier are coaxial.

14. A assembly according to claim 4 wherein said motor is provided with a brake.

\* \* \* \* \*